Figure 1:
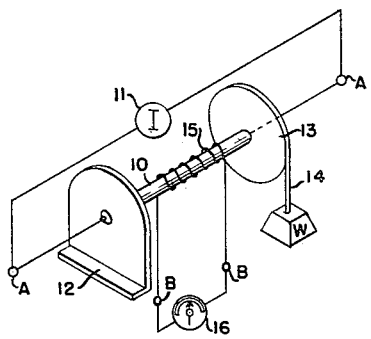

June 13, 1950     H. C. ROTERS     2,511,178
MAGNETOSTRICTIVE STRESS RESPONSIVE DEVICE
AND SYSTEM EMBODYING THE SAME
Filed Feb. 26, 1944     2 Sheets-Sheet 1

INVENTOR
HERBERT C. ROTERS
BY Laurence B. Dodds
ATTORNEY

June 13, 1950

H. C. ROTERS 2,511,178

MAGNETOSTRICTIVE STRESS RESPONSIVE DEVICE
AND SYSTEM EMBODYING THE SAME

Filed Feb. 26, 1944

2 Sheets-Sheet 2

INVENTOR
HERBERT C. ROTERS
BY
Laurence B. Dodds
ATTORNEY

Patented June 13, 1950

2,511,178

UNITED STATES PATENT OFFICE 2,511,178

MAGNETOSTRICTIVE STRESS-RESPONSIVE DEVICE AND SYSTEM EMBODYING THE SAME

Herbert C. Roters, Roslyn, N. Y., assignor to Fairchild Camera and Instrument Corporation, a corporation of Delaware Application February 26, 1944, Serial No. 524,142

4 Claims. (Cl. 73—136)

This invention relates to magnetostrictive stress-responsive devices and, more particularly, to such devices of a type comprising an elongated magnetic member normally circularly magnetized about its longitudinal axis and subject to longitudinal or torsional stresses.

It is known in the art that the magnetization of magnetic materials is accompanied by changes in physical dimensions and that, conversely, mechanical stresses applied to such magnetized magnetic materials result in changes in their magnetic characteristics. A wide variety of effects may be obtained dependent, in the case of varying magnetization, upon the manner in which the materials are magnetized and the manner of such variations, and, in the case of varying mechanical stresses upon the type of stress and its relation to the magnetization; that is, whether the stress is transverse, longitudinal, compression, tension, torsion, etc. These various magnetostrictive effects are described generally in the General Electric Review of March 1942, pages 161–163 and in the appended bibliography.

The present invention is based upon the discovery that the magnetostrictive effects resulting from (1) applying mechanical stress to a circularly magnetized elongated member, known as the inverse Wiedeman effect, and its converse (2) applying longitudinal and circular magnetization to an elongated member to produce a twist, known as the Wiedeman effect, are particularly suitable to practical arrangements for indicating, controlling, and measuring various mechanical and electrical quantities. Specifically, in the magnetostrictive phenomenon of the first type, the circular magnetization of the magnetic member is distorted effectively into helical magnetization by torsional stresses, resulting in a varying axial magnetization component the magnitude of which may be measured or derived by various means, for example, by a winding surrounding the elongated member in which the variation of the axial component of magnetization induces an electrical signal which may be used for measuring, indicating or controlling operation. In the magnetostrictive phenomenon of the second type, the longitudinal and circular magnetization may be produced in response to fixed or variable quantities and the resulting change in physical dimensions may be caused to represent a variable quantity or the product of two variable quantities.

In magnetostrictive devices of the first type, if the circular magnetization is maintained constant, the resulting derived effect is responsive to the rate of change of the applied stress; if the magnetization is periodic, for example, alternating, the derived effect is responsive to the magnitude of the applied stress; if the magnetization is periodic and if its amplitude is varied proportionally with some other variable quantity, for example, velocity, the derived effect is proportional to the product of the stress and the variable quantity.

Apparatus for indicating, measuring, and controlling operations embodying the magnetostrictive stress-responsive devices of the invention have a number of important desirable characteristics and advantages not found in more conventional apparatus designed for comparable functions. For example, the magnetostrictive devices of the invention are effective to convert force or torque into electromotive force without motion and with a high degree of sensitivity, linear response, and absence of hysteresis. Due to the fact that the response can be effected without mechanical motion, such effect may be picked up by an inductive coupling thereby avoiding electrical contacts. Furthermore, with such apparatus, an effect may be derived from the application of a steady force in contrast to certain prior art devices, for example, those utilizing piezoelectric crystals, in which an effect is derived only in response to a rate of change of force.

It is an object of the present invention, therefore, to provide a magnetostrictive stress-responsive device comprising simple and efficient apparatus for measuring, indicating or controlling operations.

It is another object of the invention to provide a magnetostrictive stress-responsive device which embodies one or more of the following important advantages not found in prior art devices designed for comparable functions: conversion of stress into electromotive force without motion; high degree of sensitivity and linearity of response; absence of hysteresis; derivation of effect by inductive coupling without electrical contacts; and derivation of effect in response to a steady stress.

In accordance with the invention, a magnetostrictive stress-responsive device comprises an elongated magnetic member normally circularly magnetized about its longitudinal axis and including provisions for applying to the member a stress to which a response is desired. The device also includes means responsive to the resulting longitudinal magnetization distortion component of the member, for example, a pick-up winding surrounding the member, for deriving an effect variable in accordance with the applied stress.

In a preferred embodiment of the invention, the elongated magnetic member is tubular in form, the pick-up winding surrounds the member and is, in turn, surrounded by shielding means which comprises also a low reluctance magnetic return circuit for the winding. A utilization circuit is connected to the pick-up winding and derives therefrom an electrical signal variable in accordance with the applied stress.

In accordance with other features of the invention, a magnetostrictive stress-responsive device of the type described is incorporated as a part of various systems for indicating, measuring or controlling variable quantities or conditions, for example, torque, power, fluid, pressure, angular velocity of supporting axes of gyroscopes, electro-acoustical waves, acceleration, displacement, etc.

As used herein and in the appended claims, the term "normally circularly magnetized member" refers to a member either permanently circularly magnetized or including provisions for applying a magnetizing field thereto during normal operation effective to produce circular magnetization of the member. The term "provisions for applying stress" to the magnetic member is used to denote connections, couplings, flanges, and the like, suitable for connection to external stress-developing or applying devices but not including such external stress sources.

For a better understanding of the present invention, together with other and further objects thereof, reference is had to the following description taken in connection with the accompanying drawings, and its scope will be pointed out in the appended claims.

Figure 2:
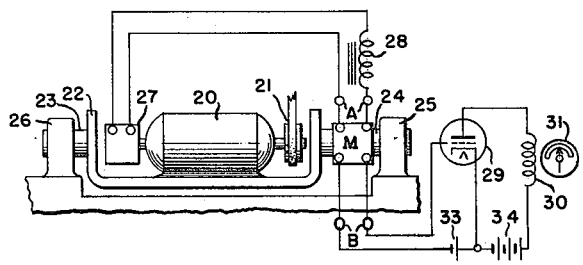
Figure 3A:
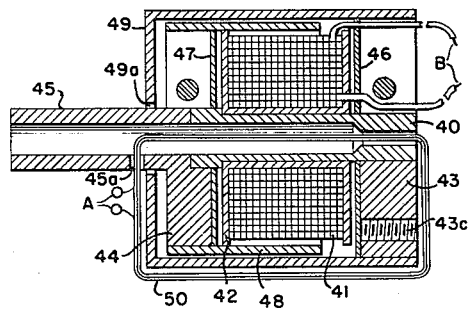
Figure 3B:
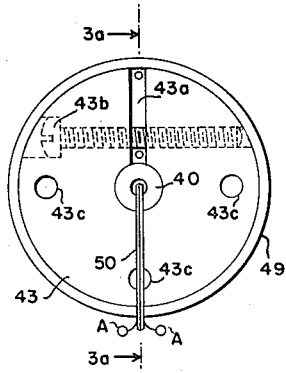

In the drawings, Fig. 1 is an elementary diagram to aid in the explanation of the invention; Fig. 2 is a view, partly schematic, of a magnetostrictive stress-responsive device in accordance with the invention embodied in a power measuring system; Figs. 3A and 3B are cross-sectional and end views, respectively, of a preferred form of the magnetostrictive stress-responsive device of the invention designed to obtain a high degree of sensitivity; Figs. 4, 5, 6, 7, 8, and 9 represent systems embodying the magnetostrictive device of the invention for indicating, measuring, responding to, or controlling, respectively, fluid pressure, electro-acoustical waves, acceleration, angular velocity of the supporting axes of a gyroscope, and deflection of a reference body.

Referring now more particularly to Fig. 1 of the drawings, there is represented a magnetostrictive stress-responsive device of elementary form comprising an elongated magnetic rod member 10 normally circularly magnetized about its longitudinal axis. This circular magnetization may result from initial permanent magnetization or it may be effected, as illustrated, by passing through the rod longitudinally a current from a source 11, usually an alternating current. The rod 10 is rigidly mounted at one end in a supporting bracket 12 and at the opposite end includes provisions for applying to the rod a torque stress to which a response is desired, these provisions comprising a pulley 13 from which is supported a cord 14 and a weight W. The device also includes means responsive to the resulting longitudinal magnetization distortion component of the magnetic rod member 10 due to the torque stress applied by the weight W. This means is illustrated as comprising a pick-up winding 15 surrounding the rod member 10 and inductively coupled thereto and provided with terminals B, B, to which there is connected a utilization circuit for deriving an electrical signal from the winding 15 variable in accordance with the applied torque stress and comprising, in this instance, a meter 16.

In considering the operation of the device of Fig. 1, it may be assumed that initially the weight W is removed and that an alternating current is supplied from the source 11 to the circuit A, A which passes longitudinally through the magnetic rod member 10. The current through the member 10 circularly magnetizes it about its longitudinal axis but results in no axial magnetization component; therefore, there is induced in the winding 15 only a negligible electromotive force equivalent to that induced in a single conductor parallel to the member 10 and of a length equal to that of the winding 15. If now the weight W is applied as illustrated, the torque stress applied to the magnetic rod member thereby is effective to distort the circular magnetization into a helical magnetization having an axial component. This axial component of alternating magnetization induces in the winding 15 an electromotive force which varies linearly with torque over a considerable range of torque variation. This electromotive force is applied to the meter 16 which, by proper calibration, may be made to give a direct indication of the applied torque in any desired unit.

In the systems of Figs. 2 and 4-9, inclusive, of the drawings, the magnetostrictive stress-responsive device represented schematically in Fig. 1 is shown in still more schematic form as the unit M having the terminals A, A for connection to the circuit to effect the circular magnetization, and the terminals B, B for connection to the utilization circuit for deriving a signal from the pick-up winding varying in accordance with the applied stress.

In Fig. 2 there is represented a system embodying the magnetostrictive device of the invention for deriving an effect varying with the power output of a rotating prime mover. This system comprises a prime mover, such as an electric motor 20, connected to drive a load, not shown, through a pulley and belt arrangement 21, and an axial support for the prime mover consisting of a cradle 22 provided with trunnions 23 and 24. The trunnion 24 is rigidly clamped in a support 25, while the trunnion 23 is journalled in a bearing in the support 26. Included as a part of, or a coupling element of, the trunnion 24 is a magnetostrictive device represented schematically at M and provided with the terminals A, A and B, B corresponding to similarly identified terminals of Fig. 1. The elongated magnetic member of the device M is circularly magnetized by exciting its winding at the terminals A, A from a tachometer 27, driven by the motor 20, through a high inductance element 28. The effect responsive to the resulting longitudinal magnetization distortion component of the member of device M is derived in the form of a first electrical signal at the terminals B, B, which is applied to the input circuit of a vacuum tube 29, the output circuit of which includes a winding 30 of a meter 31. Suitable sources of operating potential, such as the batteries 33 and 34, are provided for the vacuum tube 29.

In considering the operation of the system of Fig. 2, it will be assumed that the motor 20 is driving a given load. The torque of the motor shaft is transmitted through the cradle 22 to one end of the elongated magnetic member of the magnetostrictive device M, the other of which is rigidly clamped in support 25. Any minute angular deflections resulting from a deflection of the magnetic member of the device M are permitted by rotation of the trunnion 23 in the bearing of support 26. An electrical signal derived from the winding of the device M and responsive to the resulting longitudinal magnetization of its magnetic member is applied to the terminals B, B and thence to the input circuit of vacuum tube 29, wherein it is amplified and applied to the winding 30 of meter 31. Assuming that tachometer 27 develops an output voltage proportional to speed over the normal speed range of motor 20 but of a frequency varying with the speed of the motor, the amplitude of the exciting current of the device M is maintained substantially independent of the frequency or motor speed by the inductor 28 in circuit therewith. At any given speed and frequency, the signal appearing at the terminals B, B is proportional to the longitudinal distortion magnetization component, that is, to the torque of motor 20. However, as the motor speed varies, the frequency of the constant exciting current of device M varies correspondingly resulting in a variation in the induced voltage in the pick-up winding of device M in accordance with motor speed so that the signal appearing at terminals B, B is proportional to the product of the torque of motor 20 and its speed, that is, to its power output. By proper calibration, the deflection of the meter 31 may be made to indicate directly the power output of the motor 20 in any desired units.

Figs. 3A and 3B are, respectively, longitudinal cross-sectional and end views of a preferred construction of the magnetostrictive device of the present invention and particularly suitable for embodiment in the system of Fig. 2. In the construction of Figs. 3A and 3B, the magnetic member comprises an elongated tubular member 40 on which is disposed a pick-up winding 41 comprising a large number of turns and provided with terminals B, B. The winding 41 is formed in a spool 42 of suitable insulating material which is loosely fitted on the member 40. The member 40 includes provisions for applying thereto a stress to which a response is desired comprising the clamps 43 and 44 adapted to engage opposite ends thereof and to be connected between two points between which exists a stress to which a response is desired. For example, the clamp 43 comprises an annulus having a radial slot 43a and a tightening screw 43b extending through the slot for tightening the clamp about the end of the member 40. The member 43 is also formed with a series of screw-holes 43c by which it may be attached to a suitable coupling member. The clamp 44 is similarly constructed except that it is provided with a coaxial hub or sleeve 45 which may be formed integrally with the clamp 44 or formed separately and attached thereto by welding, brazing, or the like. The hub or sleeve 45 may be attached to a coupling element in any suitable manner. The clamps 43 and 45 are of nonmagnetic material, such as brass, while the magnetic member 40 is preferably of a high permeability material, such as a 50-50 nickel-iron alloy hydrogen annealed after fabrication.

The construction of Figs. 3A, 3B also comprises shielding means surrounding the pick-up winding 41 for minimizing the effect thereon of extraneous magnetic fields and for reducing the reluctance of the magnetic circuit of the longitudinal magnetization component of the member 40. This means comprises the end rings 46, 47 of high permeability magnetic material disposed with a light press fit on the magnetic member 40 at opposite ends of the coil spool 42. The fit should not be sufficiently tight appreciably to stress the magnetic member 40. The shielding means also comprises an annular ring 48 of high permeability magnetic material press-fitted over the clamp 44 and substantially enclosing the pick-up winding 41. In addition, a cup-shaped magnetic member 49 surrounds the entire assembly and is mounted with a press-fit on the clamp 43, being formed with a central aperture 49a loosely surrounding the hub 45 of the clamp 44. It is important in the design and construction of the device of Figs. 3A and 3B to stress magnetic member 40 to a minimum degree and to ensure that any stresses which are applied to such member are transverse rather than longitudinal and are symmetrical. This is desirable in order to minimize the zero signal induced in the pick-up winding 41 in the absence of an external applied stress.

The construction of Figs. 3A and 3B also includes an electrical circuit effective when excited to magnetize the member 40 circularly about its longitudinal axis. This circuit includes the terminals A, A and longitudinal winding 50 threading the tubular member and surrounding substantially the entire radial cross section of the magnetic member 40. To accommodate the winding an aperture 45a is formed in the hub 45, while a slot or keyway will be formed in the coupling element attached to the clamp 43 to accommodate the end portion of the winding 50. A suitable utilization circuit may be connected to the terminals B, B of the winding 41 for deriving therefrom an electrical signal variable in accordance with the torque applied to the member 40.

The operation of the magnetostrictive device of Figs. 3A and 3B is the same as that described in connection with the device of Fig. 1. The winding 50 may be supplied with either direct or alternating current and produces circular magnetization in the central tubular portion of the magnetic member 40. If the excitation current is alternating, a steady alternating voltage is induced in the winding 41 which is proportional to the product of the torque on the member 40 and to the exciting current of the winding 50. If the exciting current of the winding 50 is unidirectional, the voltage induced in the winding 41 is proportional to the rate of change of torque.

The construction of Figs. 3A and 3B has a number of desirable features and advantages, among which may be mentioned the low-reluctance path for the longitudinal magnetization component of the member 40, resulting in increased sensitivity; the shielding of the pick-up winding 41 from all external stray magnetic fields. In addition, the construction of the magnetic member 40 as a tubular element enhances the sensitivity of the device, since it concentrates the material of the magnetic member near the periphery where it is stressed to the highest degree. This construction also permits the provision of an exciting winding and circuit insulated from the magnetic member.

Figure 4:
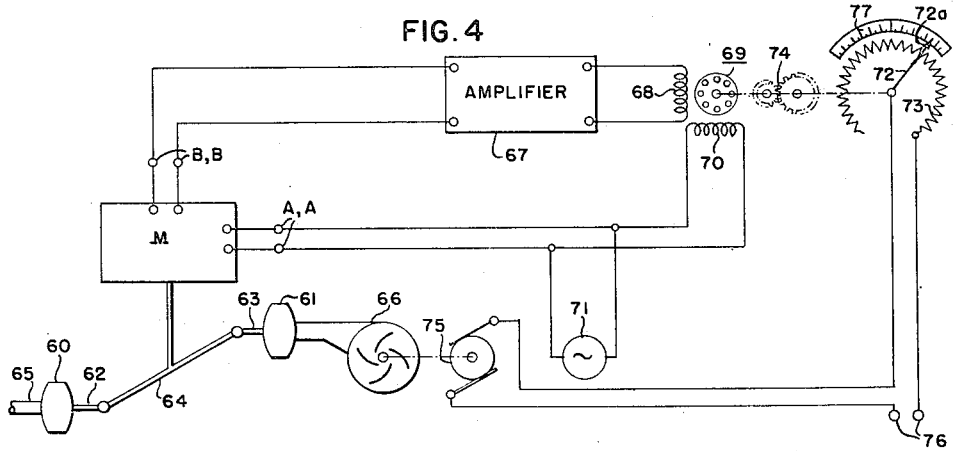

In Fig. 4 there is represented a self-balancing null system embodying the magnetostrictive device of the invention for deriving an effect varying with the fluid pressure of a fluid system comprising a differential fluid-responsive device consisting of diaphragm bellows 60 and 61 pivotally connected by means of thrust arms 62 and 63, respectively, to a cross link 64 which is rigidly connected to the magnetic member of the magnetostrictive device M. The bellows 60 is provided with an inlet 65 for connection to the fluid system to be measured. The system includes a fluid pressure generating means, such as a centrifugal pump 66, connected to the bellows 61 to act in opposition to the fluid pressure from the inlet 65. The terminals B, B of the magnetostrictive device M derive a first effect, such as an electrical signal, variable in accordance with the differential stress applied to the magnetic member of the device M. The system also includes means responsive to such derived effect for controlling the fluid pressure generating means 66 to balance its pressure and that of the fluid inlet 65 comprising a vacuum-tube amplifier 67 to the input circuit of which the derived signal is applied and the output circuit of which is connected to one phase winding 68 of a two-phase reversible motor 69. The motor 69 is provided with a second winding 70 excited from a suitable source of alternating current 71. The source 71 is also connected to the terminals A for applying an alternating current excitation of constant amplitude to the magnetizing winding of the device M. The reversible motor 69 is connected to operate an adjustable contact 72 of an adjustable resistor 73 through suitable reduction gearing 74. The pump 66 is driven by a motor 75 excited from a suitable supply circuit 76 through the resistor 73. The adjustable contact 72 may be provided with an extension 72a comprising a pointer co-operating with a scale 77 to derive a second effect, that is, a scale indication, varying with the extent of control of the controlling means.

In the operation of the system of Fig. 4 a variation in the fluid pressure at the inlet 65 produces a torsional stress on the magnetostrictive device M, from which there is derived an electrical signal varying in sense and magnitude with the applied stress. This signal is amplified in the unit 67 and applied to the winding 68 of motor 69, causing rotation thereof in a direction to adjust the resistor 73 in the proper sense to adjust the speed of the motor 75 so that the fluid pressure developed by the pump 66 is adjusted to the same value as that at the inlet 65. The system is thus restored to equilibrium and the stress removed from the device M. The pointer 72a indicates the new fluid pressure at the inlet 65 and, by proper calibration of the system, may be made to indicate that pressure directly in any desired unit.

Figure 5:
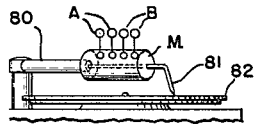

In Fig. 5 is represented schematically an electro-acoustical translating device, either of the recording or pick-up type embodying the magnetostrictive device of the invention. In this arrangement the device M is rigidly supported at one end from the pivoted arm 80, while an acoustical device, such as a cutter or pick-up needle 81, is mounted on the end remote from its point of support and adapted to co-operate with a sound record 82 supported on a rotating turntable, not shown, beneath the cutter or needle 81.

In case the device of Fig. 5 is used as a pick-up device, a direct current or supersonic alternating current is applied to the terminals A, while the audio-frequency output signal is derived from the terminals B. If terminals A, A are excited by direct current, a signal proportional to the velocity of the needle is developed at terminals B, B while if the terminals are excited by a supersonic alternating current, the output signal at terminals B, B is proportional to the displacement of the needle. If the arrangement of Fig. 5 is used as a recording cutter, the terminals A may be similarly excited while the audio-frequency input signal is applied to the terminals B. The principles of operation are substantially identical to those of the previously described systems, except that when operating as a recorder the Wiedeman effect is utilized rather than the inverse Wiedeman effect, as in the systems previously described.

Figure 6:
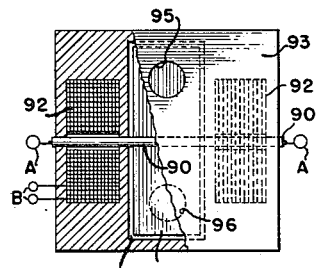

In Fig. 6 is represented a modified form of an electro-acoustical translating device embodying the magnetostrictive device of the invention which may be used either as a loudspeaker or as a microphone. In this case, the magnetic member 90 is connected directly in the exciting circuit between the terminals A, A, excitation of which produces the desired circular magnetization. Rigidly mounted on the magnetic member 90 is an acoustical vane 91. Surrounding the magnetic member 90 are the pick-up windings 92, 92 connected in series between the terminals B. Surrounding the windings 92, 92 and the vane 91 is a magnetic yoke 93 including a recess or sound chamber 94 in which the vane 91 is closely but freely fitted, the member 90 being rigidly supported at both ends in the yoke 93 as indicated. In the front wall of the yoke 93 is an aperture 95 which vents the sound chamber at the front of the upper portion of the vane 91, while in the back wall of the yoke 93 is a second aperture 96 which vents the sound chamber at the rear side of the lower portion of the vane 91.

In operation, the structure of Fig. 6 may act as a sound reproducer by applying the audio-frequency input signal to the terminals B and applying a unidirectional or supersonic alternating exciting current to the terminals A, A. Conversely, the apparatus may be utilized as a microphone by subjecting it to sound waves, similarly exciting the circuit including the terminals A, A, and deriving the audio-frequency signal from the terminals B. The operation is essentially similar to that of the apparatus of Fig. 5.

Figure 7:
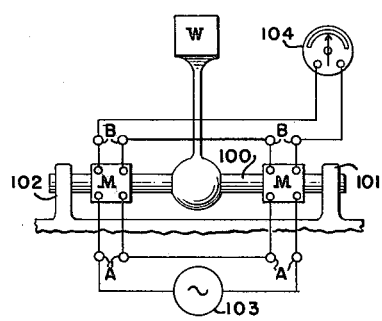

In Fig. 7 is represented schematically a system embodying the magnetostrictive device of the invention for deriving an effect varying with rectilinear acceleration and embodying a magnetostrictive device in accordance with the invention. This apparatus comprises a mass W rigidly supported from a longitudinal shaft 100 rigidly clamped at opposite ends in the supports 101, 102, the axis of the shaft 100 being disposed in a plane including the center of gravity of the mass W and normal to the direction of acceleration. The axis of shaft 100 is substantially displaced, preferably below, the center of gravity of the mass W, so that it is in unstable equilibrium. A magnetostrictive device M is included in the shaft 100 between the point of support of the mass W and one, or preferably each, of the supports 101, 102, as illustrated. A suitable source of exciting current 103 is connected to the terminals A, A in such a way as to excite the magnetizing windings of the devices M, M in series. Similarly, the terminals B, B of the devices M, M are connected in series opposition and act to derive an effect varying with the longitudinal magnetization component of the magnetic members of the devices M, M which, in turn, varies in accordance with the rectilinear acceleration of the mass W normal to the plane including the center of gravity of the mass W and the axis of the shaft 100. The derived effect, that is, the signal from the terminals B, B, may be applied to the meter 104 which may be calibrated to indicate directly the acceleration of the mass W in any suitable units.

In operation, the rectilinear acceleration of the mass W is effective to place a torsional stress on the magnetic members of the magnetostrictive devices M, M from which the system derives an indication in a manner similar to that of the previously described systems. By including the magnetostrictive devices M, M on either side of the support of the mass W and connecting their respective windings with such relative polarities as to produce circular magnetizations in the magnetic members of the devices M, M, in the same direction when viewing them as a single element and by connecting the terminals B, B of the devices M, M, so that the signal voltages due to the applied torsion are cumulative, any errors due to the static transverse stresses developed in the magnetic members of the devices M, M are balanced out.

Figure 8:
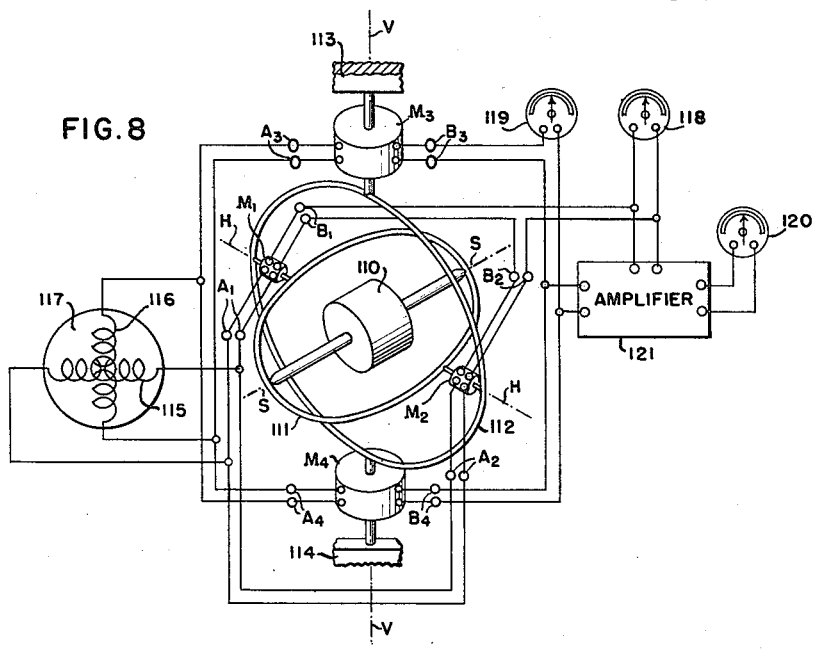

In Fig. 8 is represented a system embodying the magnetostrictive device of the invention for deriving an effect varying with a time-derivative of the angular displacement of an axis of support of a gyroscope without precession; specifically, the system is effective to derive effects varying with the angular velocities of the two axes of support of a gyroscope without precession. The system comprises a conventional gyroscope 110 mounted on a spin axis S which is preferably the longitudinal axis of the vehicle on which the gyroscope is mounted. The gyroscope 110 is supported in an inner gimbal ring 111 which, in turn, is supported in an outer gimbal ring 112 about a horizontal axis H in a plane including the spin axis S but normal thereto, while the outer gimbal ring is mounted from fixed supports 113, 114 about a vertical axis V normal to the axes S and H. Instead of the usual pivot at each of the points of support of the gimbal system, there are provided rigid supports including the magnetostrictive devices $M_1$ and $M_2$ mounted on the axis H, and the magnetostrictive devices $M_3$ and $M_4$ mounted on the axis V. The magnetostrictive devices $M_1$—$M_4$ are provided with exciting circuit terminals $A_1$—$A_4$ and pick-up or output windings $B_1$—$B_4$ respectively. The exciting windings $A_1$ and $A_2$ are excited in parallel from a winding 115 of a suitable source of power, such as a generator 117, while the exciting windings $A_3$ and $A_4$ are excited from a winding 116 of the generator 117. The output terminals $B_1$ and $B_2$ of the magnetostrictive devices $M_1$ and $M_2$, respectively, are connected in series with an indicating device, such as a meter 118; similarly, the output terminals $B_3$ and $B_4$ of the magnetostrictive devices $M_3$ and $M_4$, respectively, are connected to a meter 119.

In operation of the system of Fig. 8 and considering, for the moment, that the windings 115 and 116 constitute independent sources of alternating current, it is well known that any angular velocity of the gyroscope system about the horizontal axis H results in a torque on the magnetostrictive devices $M_3$, $M_4$ about the vertical axis V. As a result, the longitudinal magnetization components of the magnetic members of the devices $M_3$ and $M_4$ induce voltages in their pick-up windings which are applied to their respective output terminals $B_3$, $B_4$ and are added in series as applied to the meter 119. The meter 119, by proper calibration, may be made to indicate directly a time-derivative of the angular displacement, specifically, the first time-derivative or angular velocity of the system about the horizontal axis H. Similarly, the meter 118 may be calibrated to indicate directly the angular velocity of the system about the vertical axis V. If the windings 115, and 116 constitute sources of direct current for exciting the magnetostrictive devices $M_1$—$M_4$, the signals developed at the output terminals $B_1$, $B_2$, $B_3$ and $B_4$ are proportional to the second time-derivative of the angular displacement, that is, the angular acceleration, of the system about its axes H and V, respectively. It is noted that precession of the gyroscope system is completely suppressed due to the rigid supports of the system with the result that it is unnecessary to provide an independent gyro-erecting system and at the same time the errors introduced by precession of the gyroscope are avoided.

If now the windings 115 and 116 of the generator 117 constitute quadrature-phase windings of a two-phase generator, so that the excitation of the magnetostrictive devices $M_1$ and $M_2$ is in quadrature with that of the devices $M_3$ and $M_4$, it can be shown that the vector sum of the voltages induced in the output circuits of the devices $M_1$ and $M_2$ and the devices $M_3$ and $M_4$ represent the true velocity of turn of the gyroscope system about the vertical, provided that the spin axis S remains horizontal. This resultant may be applied in series to an additional indicating meter 120 through an amplifier 121 to indicate directly the angular velocity of turn of the system about the vertical.

Figure 9:
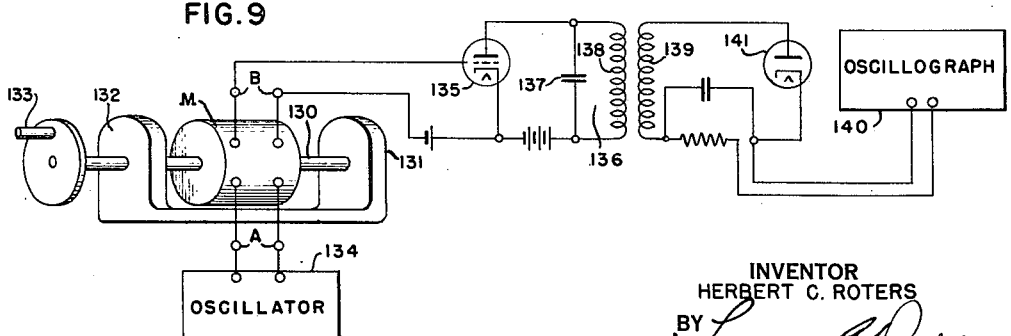

In Fig. 9 is represented a system embodying the magnetostrictive device of the invention for deriving an effect varying with a deflection of a reference body. This system comprises a magnetostrictive device M forming a part of a shaft 130 rigidly clamped at one end in a support 131 and journalled at the other end in a support 132. At the end of the shaft 130 remote from the support 131 are provisions such as a crankpin 133 for angularly deflecting the magnetic member of the magnetostrictive device M about its longitudinal axis in accordance with a force or a deflection which it is desired to measure. The exciting circuit of the magnetostrictive device M is energized from an oscillator 134 of a frequency which is high compared to any frequency of deflection or change of force to which it is desired to respond. The output terminals B, B of the device M are connected to the input circuit of a vacuum-tube amplifier 135 having an output circuit 136 comprising a condenser 137 and inductor 138 tuned to the frequency of the oscillator 134. A secondary inductor 139 is coupled to the inductor 138 and is connected to an oscillograph 140 through a diode rectifier 141.

It will be apparent that, in the operation of the system of Fig. 9, deflections or forces applied to the crankpin 133 produce a longitudinal magnetization component in the magnetic member of the magnetostrictive device M which is effective to induce a first effect or signal at the terminals B, B. This signal comprises a high-frequency wave as developed by the oscillator 134 modulated in accordance with the stress applied to the magnetostrictive device M from the crankpin 133. The first signal is amplified in the amplifier 135 and converted in the rectifier 141 to a second signal which is applied to the oscillograph 140. This second signal comprises the modulation envelope of the first signal appearing at the terminals B, B and thus varies in form and amplitude in accordance with the deflection or force applied to the crankpin 133. This system has an advantage in comparison with the conventional prior art systems in that it obtains a signal proportional to a deflection or a force, as the case may be, instead of to the time-derivative of the deflection or force. As a corollary, the signal output of the system is zero when the stress is zero, which avoids the necessity of a careful calibration of the system.

Thus it is seen that the magnetostrictive device of the invention and the systems describing above embodying such devices have the important advantageous characteristics mentioned above; that is, they are effective to convert force or torque into electromotive force without motion and with a high degree of sensitivity, linear response, and absence of hysteresis. For the highest degree of accuracy the systems should be operated at as nearly constant temperature as possible. In addition, the magnetostrictive devices should be magnetically shielded as in the structure of Figs. 3A and 3B, while the elongated magnetic member of the magnetostrictive device should be of low-hysteresis high-permeability material, such as the nickel-iron alloy described above.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A magnetostrictive stress-responsive device comprising a tubular magnetic member of substantial longitudinal dimensions normally circularly magnetized about its longitudinal axis, provisions for applying to said member a torsional stress to which a response is desired, a pick-up winding surrounding said member, shielding means surrounding said winding and comprising a low-reluctance magnetic return circuit therefor, and a utilization circuit connected to said winding and deriving therefrom an electrical signal variable in accordance with said stress.

2. A magnetostrictive stress-responsive device comprising a tubular magnetic member of substantial longitudinal dimensions, an exciting winding threading said member and surrounding the radial cross section thereof, provisions for applying to said member a torsional stress to which a response is desired, an annular recess formed in said member, a pick-up winding disposed in said recess, shielding means surrounding said winding and comprising a low-reluctance magnetic return circuit therefor, and a utilization circuit connected to said winding and deriving therefrom an electrical signal variable in accordance with said stress.

3. A system for deriving an effect varying with the torque output of a rotating prime mover comprising, an axial support for said prime mover rigidly constrained at at least one end, a magnetostrictive stress-responsive device including a magnetic member of substantial longitudinal dimensions included in said support between said prime mover and said constrained end, means for normally circularly magnetizing said member about its longitudinal axis, and means responsive to the resulting longitudinal magnetization distortion component of said member for deriving an effect varying in accordance with the torque output of said prime mover.

4. A system for deriving an effect varying with the power output of a rotating prime mover comprising, an axial support for said prime mover rigidly constrained at at least one end, a magnetostrictive stress-responsive device including a magnetic member of substantial longitudinal dimensions included in said support between said prime mover and said constrained end, means for normally circularly magnetizing said member about its longitudinal axis, means for developing a first electrical signal variable in accordance with the speed of said prime mover and for exciting said magnetizing means therewith, means responsive to the resulting longitudinal magnetization distortion component of said member for deriving a second electrical signal varying in accordance with the product of torque output and speed of said prime mover, and a power meter responsive jointly to said second signal.

HERBERT C. ROTERS.

REFERENCES CITED

The following references are of record in the file of this patent:

UNITED STATES PATENTS

| Number | Name | Date |
| --- | --- | --- |
| 302,976 | Brackett | Aug. 5, 1884 |
| 1,821,836 | Hull | Sept. 1, 1931 |
| 1,831,597 | Henderson | Nov. 10, 1931 |
| 1,882,401 | Pierce | Oct. 11, 1932 |
| 2,053,560 | Janovsky | Sept. 8, 1936 |
| 2,180,176 | Stone | Nov. 14, 1939 |
| 2,193,707 | Baumann | Mar. 12, 1940 |
| 2,269,068 | Corbin | Jan. 6, 1942 |
| 2,287,794 | Gunn | June 30, 1942 |
| 2,338,732 | Nocker | Jan. 11, 1944 |
| 2,365,073 | Haight | Dec. 12, 1944 |
| 2,385,005 | Langer | Sept. 18, 1945 |

FOREIGN PATENTS

| Number | Country | Date |
| --- | --- | --- |
| 49,262 | France | Nov. 12, 1938 |
| 442,441 | Great Britain | Feb. 3, 1936 |
| 659,658 | France | Feb. 5, 1929 |
| 831,342 | France | June 7, 1938 |

OTHER REFERENCES

An article entitled, "Application of the inverse Wiedemann effect to torque measurements and to torque variation recordings," by Tatuo Kobayasi. Article 52 of Reports Aeronautical Institute of Tokio University. Pages 425 to 445.